(12) United States Patent
Tsuchiya et al.

(10) Patent No.: US 6,280,334 B1
(45) Date of Patent: Aug. 28, 2001

(54) FLYWHEEL FOR INTERNAL COMBUSTION ENGINE

(75) Inventors: Shouichi Tsuchiya, Kanagawa; Masamichi Matsuoka, Tokyo, both of (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/410,096

(22) Filed: Oct. 1, 1999

(30) Foreign Application Priority Data

Oct. 2, 1998 (JP) .................................................. 10-281236

(51) Int. Cl.⁷ ....................................................... F16D 3/52
(52) U.S. Cl. ................................. 464/98; 464/92; 192/200
(58) Field of Search .................................. 464/98, 99, 51, 464/68, 92; 192/200, 70.17, 109 B

(56) References Cited

U.S. PATENT DOCUMENTS 5,362,276 * 11/1994 Fuehrer et al. ........................ 464/68
5,515,745 * 5/1996 Tsuruta et al. ....................... 192/200
5,868,624   9/1999 Fukushima et al. .
5,908,095 * 6/1999 Jackel et al. ....................... 192/70.17
6,039,651 * 3/2000 Fukushima et al. .................... 464/98

FOREIGN PATENT DOCUMENTS 9-217791   8/1997 (JP) .

* cited by examiner

Primary Examiner—Lynne H. Browne
Assistant Examiner—Aaron Dunwoody
(74) Attorney, Agent, or Firm—Foley & Lardner

(57) ABSTRACT

A flywheel for an internal combustion engine includes a flexible plate connected to a crankshaft of the engine. A mass member is connected to the flexible plate. A clearance is formed at an axially outer portion with respect to a connecting portion of the flexible plate to the crankshaft. A spring member is disposed in the clearance such that both ends of the spring member being in contact with clearance defining surfaces of the flexible plate and the mass member, respectively. This flywheel enables the prevision of the spring member without increasing a thickness of an installing portion to the crankshaft.

15 Claims, 19 Drawing Sheets

FLYWHEEL FOR INTERNAL COMBUSTION ENGINE

BACKGROUND OF THE INVENTION

The present invention relates to improvements in a flywheel for an internal combustion engine.

A flywheel for an internal combustion engine generally has a characteristic that a bending vibration based on mass of a mass member tends to generate if the mass member is in direct contact with a crankshaft of an internal combustion engine. Such bending vibration tends to cause noises for occupants in a passenger compartment in a vehicle. In order to suppress such noises, an attempt for varying the frequency of the bending characteristic vibration from a regular range has been executed. For example, JP-A-9-217791 discloses such arranged flywheel for an internal combustion engine. This flywheel is arranged such that a crankshaft of the engine is connected to a mass member through a flexible plate having a bending flexibility. More specifically, a diametrically inner portion of the flexible plate is fixed to the crankshaft by means of installation bolts, and a diametrically outer portion of the flexible plate is connected to the mass member. In a clearance defined by the flexible plate and the mass member, a washer plate is disposed so as to be able to be in contact with the mass member. A center portion of the washer plate is installed to the crankshaft.

SUMMARY OF THE INVENTION

Although this conventional flywheel performs an excellent bending vibration damping performance, the installation structure of the washer plate to the crankshaft invites a large projection of installation bolts. This projection of the installation bolts will affect an arrangement of a clutch apparatus connected to the flywheel.

It is an object of the present invention to provide an improved flywheel that enables an installation of a spring member without increasing a projecting amount of installation bolts while improving a damping performance of bending vibration.

A flywheel according to the present invention is for an internal combustion engine and comprises an flexible plate connected to a crankshaft of the engine. A mass member is connected to the flexible plate. A clearance is formed at a diametrically outer portion with respect to a connecting portion of the flexible plate to the crankshaft. A spring member is disposed in the clearance. Both ends of the spring member are in contact with clearance defining surfaces of the clearance.

BRIEF DESCRIPTION OF THE DRAWINGS

In the drawings, like reference numerals denote like parts and elements throughout all figures, in which.

DETAILED DESCRIPTION OF THE INVENTION

Referring to drawings, embodiments according to the present invention will be discussed.

Figure 1:
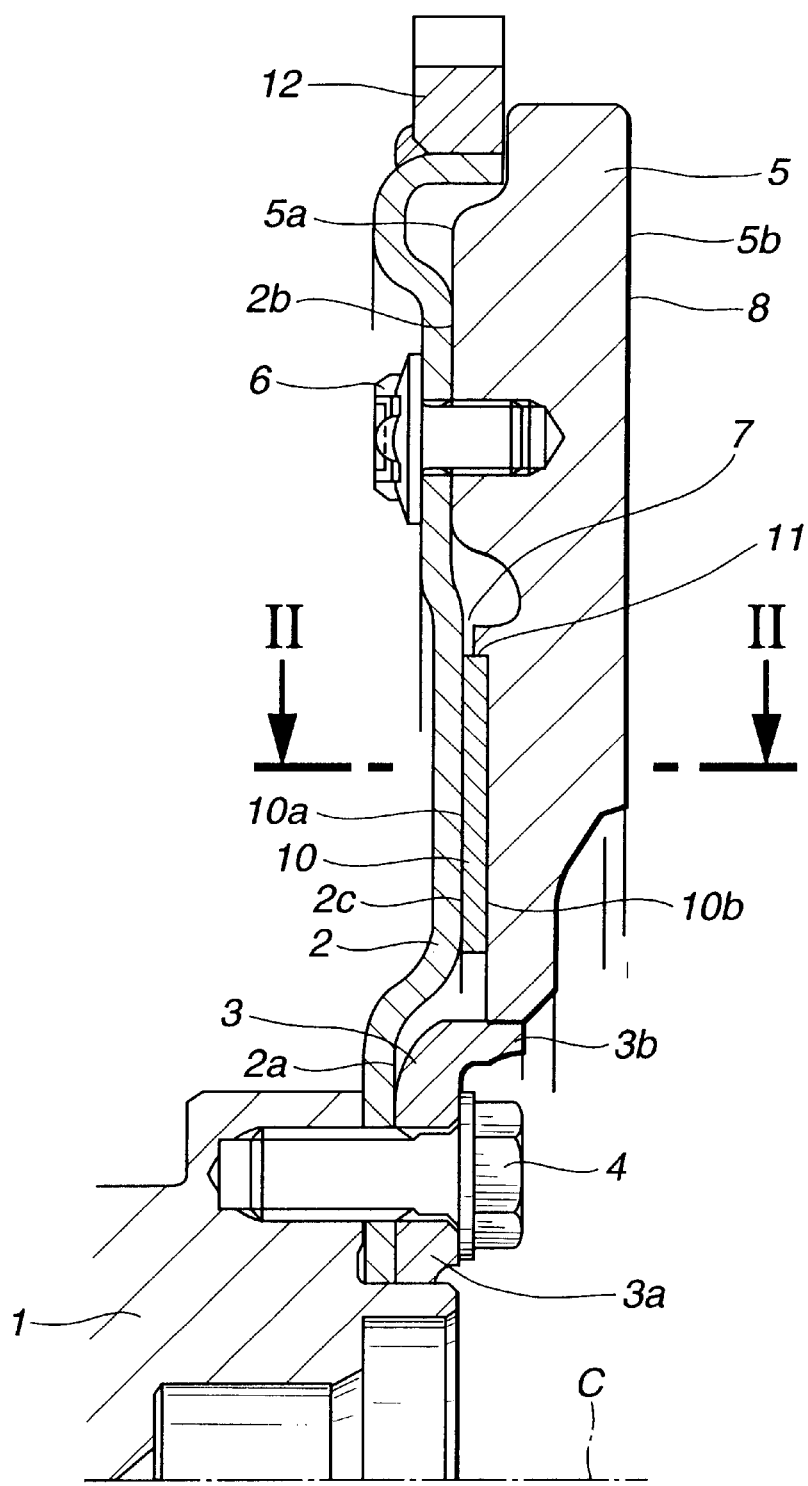
FIG. 1 is a partial cross-sectional view showing a first embodiment of a flywheel for an internal combustion engine according to the present invention.
Figure 2:
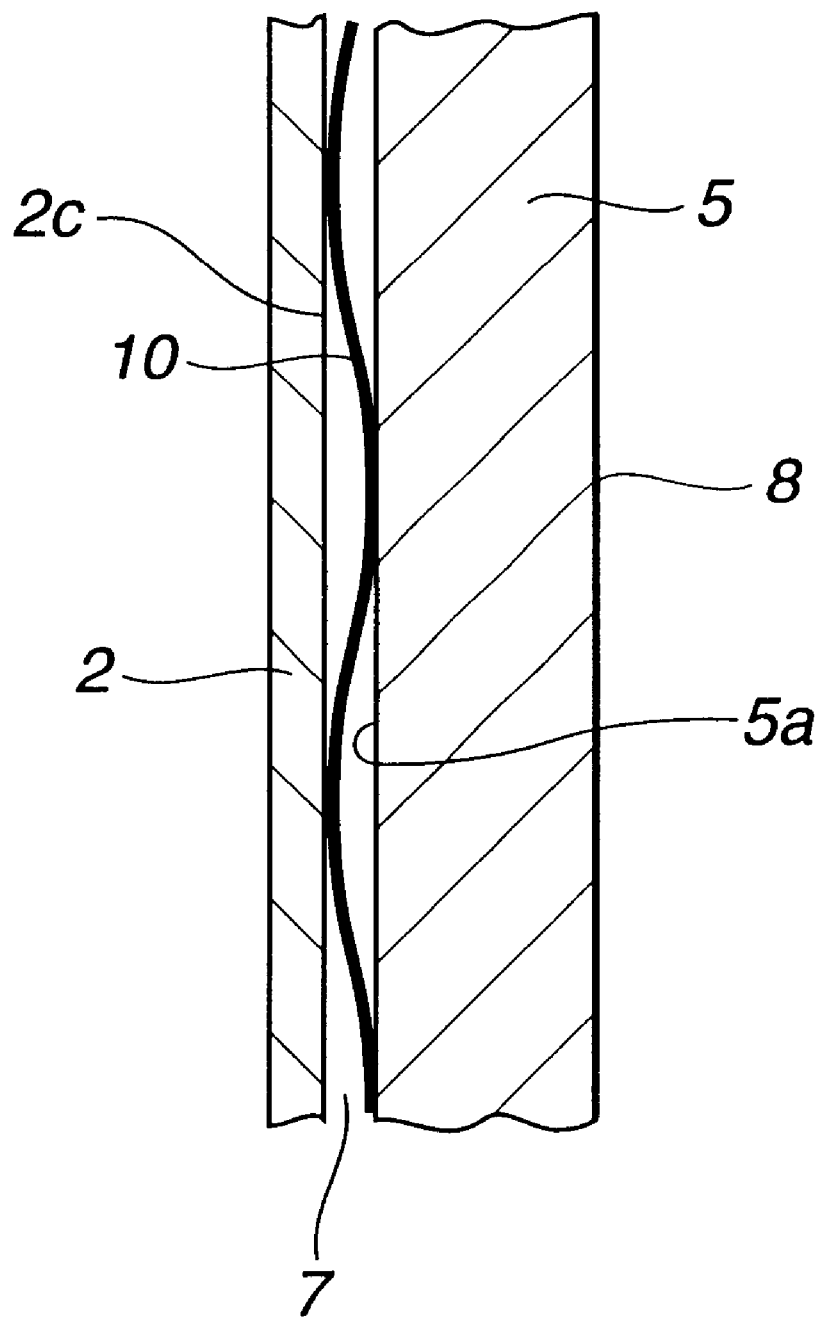
FIG. 2 is a cross-sectional view taken in the direction of the arrows substantially along the lines II—II of FIG. 1.

Referring to FIGS. 1 and 2, there is shown a first embodiment of a flywheel of an internal combustion engine according to the present invention. Although FIG. 1 shows a partial cross-sectional view of the flywheel, it will be understood that the flywheel of the first embodiment is generally symmetric with respect to an axis C of FIG. 1. The flywheel of the first embodiment according to the present invention comprises a flexible plate 2 of a disc shape which has a flexibility in its bending direction. The flexible plate 2 is fixedly connected to a crankshaft 1 of an internal combustion engine (not shown). A reinforcement plate 3 is installed at a diametrically inner portion of the flexible plate 2. The flexible plate 2 and the reinforcement plate 3 are overlapped with each other and are fixed to the crankshaft 1 by means of installation bolts 4. A mass member 5 of an annular disc shape is installed at a diametrically outer portion 2b of the flexible plate 2 by means of installation bolts 6.

Only an installation portion of a first surface 5a of the mass member 5 is in contact with the flexible plate 2. The other portion of the first surface 5a of the mass member 5 is apart from the flexible plate 2 so as to form a clearance 7 therebetween as shown in FIG. 1. A friction surface 8 for facing with a friction plate (not shown) of a clutch apparatus is formed at the other surface 5b of the mass member 5 opposite to the first surface 5a including the installation portion.

The reinforcement plate 3 comprises a plate-shaped base portion 3a that is in contact with an inner portion 2a of the flexible plate 2, and an annular flange portion 3b extending from an outer periphery of the base portion 3a to an axial direction. The base portion 3a functions to reinforce an installation portion of the flexible plate 2 to the crankshaft 1. The annular flange portion 3b functions to guide the mass member 5 for installation.

As shown in FIGS. 1 and 2, a spring member 10 is disposed in the clearance 7 defined by the flexible plate 2 and the mass member 5. Both end surfaces of the spring member 10 are in contact with the flexible plate 2 and the mass member 5, respectively. The spring member 10 is an annular waved plate spring as shown in FIG. 2. An outer periphery of the spring member 10 is fixed to a step portion 11 of the mass member 5 so that the spring member 10 is positioned diametrically. A ring gear 12 is installed at an outer periphery of the flexible plate 2 by means of welding.

With this arrangement of the first embodiment according to the present invention, by the rotation of the crankshaft 1, a rotational force is transmitted from the crankshaft 1 to the flexible plate 2 through the mass member 5. During this transmitting operation, the flexible plate 2 and the spring member 10 function to vary the characteristic frequency of a bending vibration generated in a crankshaft system from a regular range and to absorb the bending vibration. Since the spring member 10 is deformed between the flexible member 2 and the mass member 5, the end surfaces of the spring member 10 generate friction at their contacting portions to the flexible plate 2 and the mass member 5, respectively. This friction functions to damp the bending vibration of the crankshaft 1.

The spring member 10 is disposed in the clearance 7 formed between the flexible plate 2 and the mass member 5 and is not located at a portion corresponding to the fixing portion of the flexible plate 2 to the crankshaft 1. Therefore, this arrangement of the spring member 10 prevents the fixing bolts 4 from largely projecting from an end surface of the crankshaft 1. Accordingly, this arrangement provides a flywheel which functions to efficiently suppress the bending vibration of the crankshaft system.

Further, since the outer periphery of the spring member 10 is fixed to the step portion 11 of the mass member 5, the spring member 10 is easily positioned at a correct position. This restricts the spring member 10 from moving diametrically.

Referring to FIGS. 3 to 9, second to seventh embodiments of the flywheel according to the present invention will be discussed. Each of these second to seventh embodiments employs a truncated-cone shaped disc spring as a spring member 10. Hereinafter, the explanation of these embodiments will be discussed. Like reference numerals denote like elements and components of the first embodiment, and the explanation thereof is omitted herein.

First, the second to fifth embodiments shown in FIGS. 3 to 6, respectively, will be discussed. In these embodiments, the spring member 10 is a truncated-cone shaped disc spring. The spring member 10 is disposed in a clearance 7 defined between the flexible plate 2 and the mass member 5, while receiving an initial compressive stress.

Figure 3:
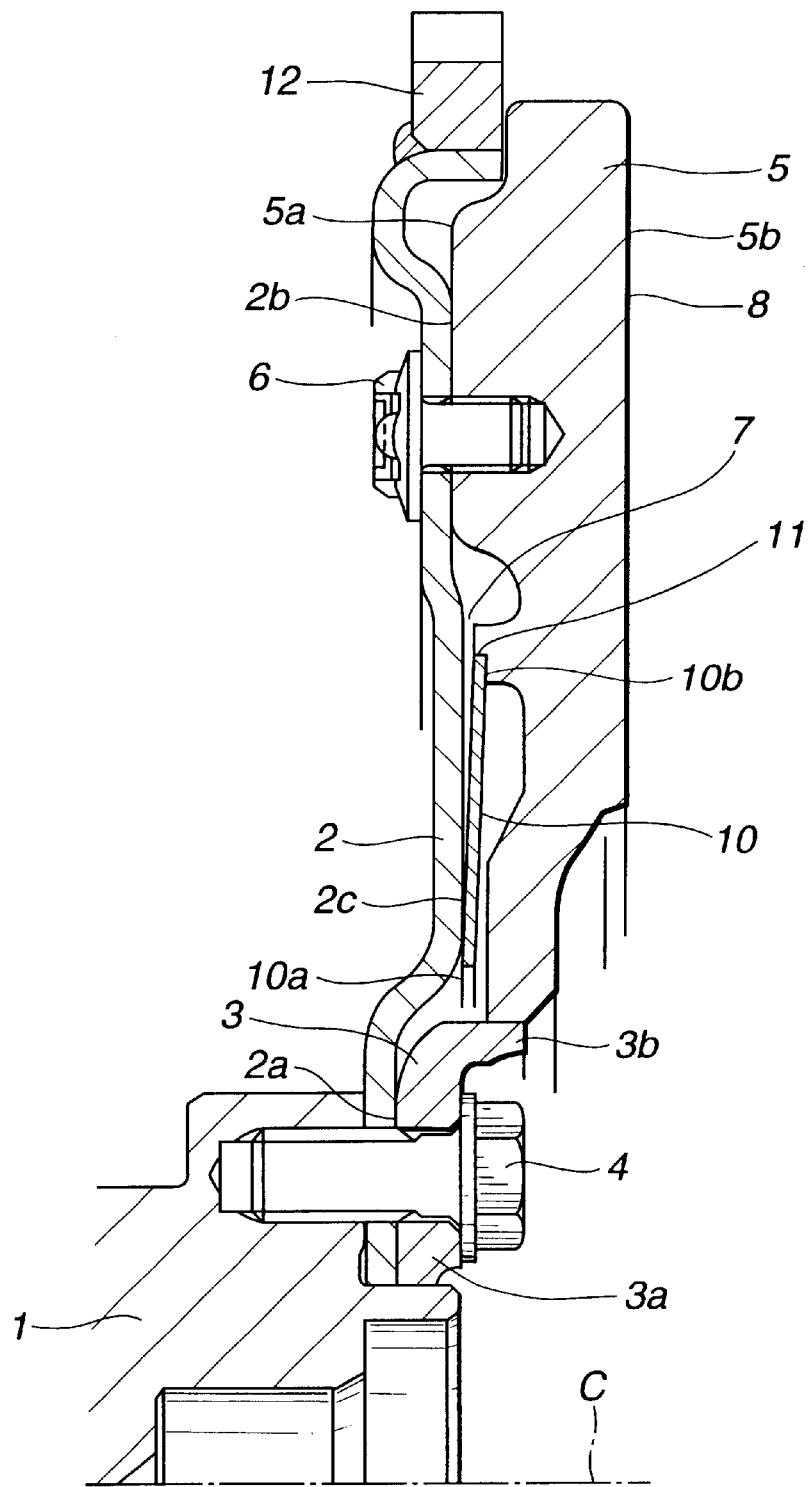
FIG. 3 is a partial cross-sectional view showing a second embodiment of the flywheel according to the present invention.
Figure 4:
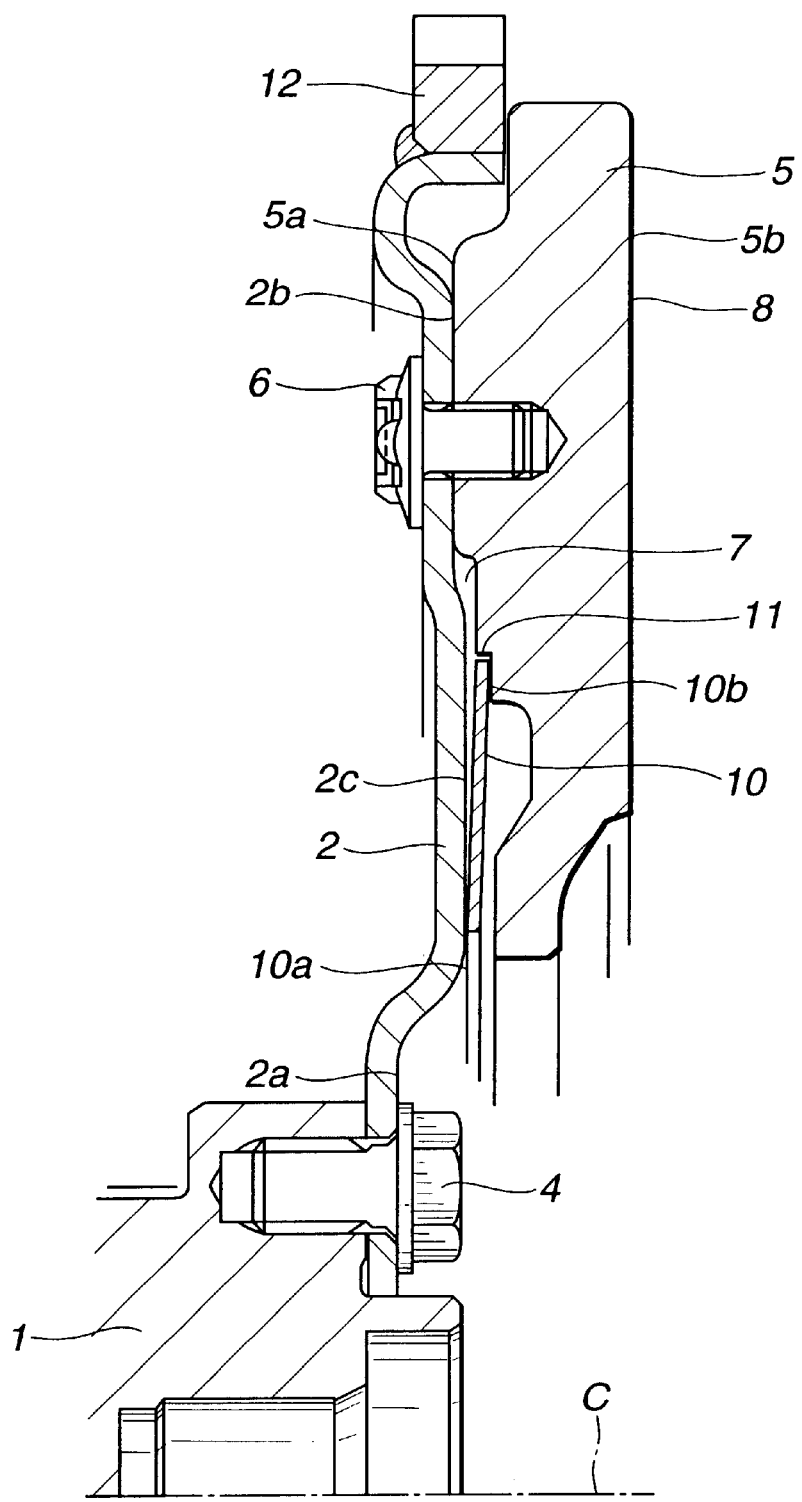
FIG. 4 is a partial cross-sectional view showing a third embodiment of the flywheel according to the present invention.

The second and third embodiments respectively shown in FIGS. 3 and 4 are arranged such that a truncated surface portion 10a of the spring member 10 is in contact with the flexible plate 2 and a bottom surface of the spring member 10 is in contact with a step portion 11 of a mass member 5 so as to position the spring member 10 diametrically.

Figure 5:
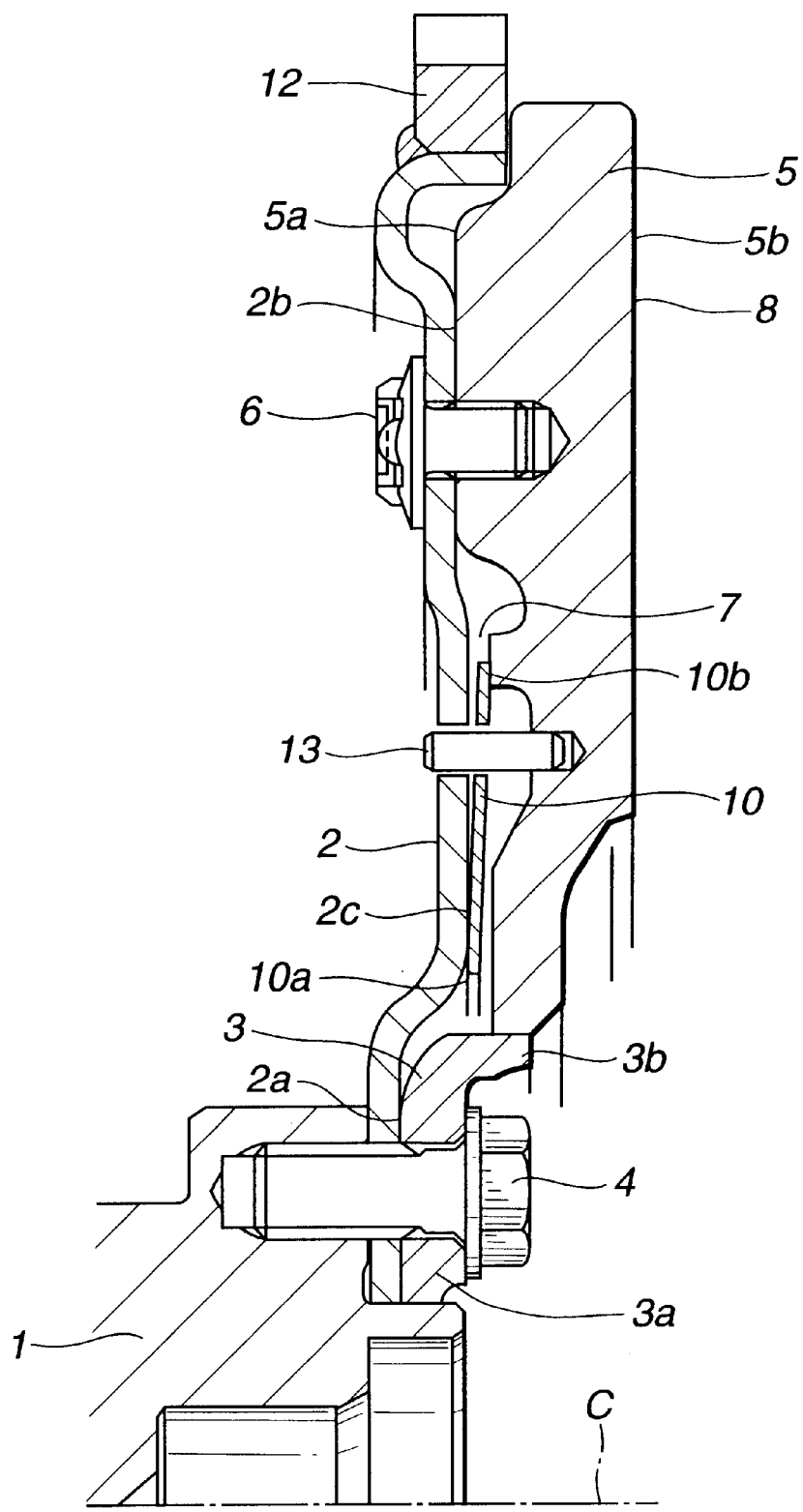
FIG. 5 is a partial cross-sectional view showing a fourth embodiment of the flywheel according to the present invention.

The fourth embodiment shown in FIG. 5 is arranged such that a truncated surface portion 10a of the spring member 10 is in contact with the flexible plate 2 and a bottom surface portion 10b of the spring member 10 is in contact with the mass member 5, and a pin 13 embedded in the mass member 5 penetrates an outer portion of the spring member 10 to fix the spring member 10.

Figure 6:
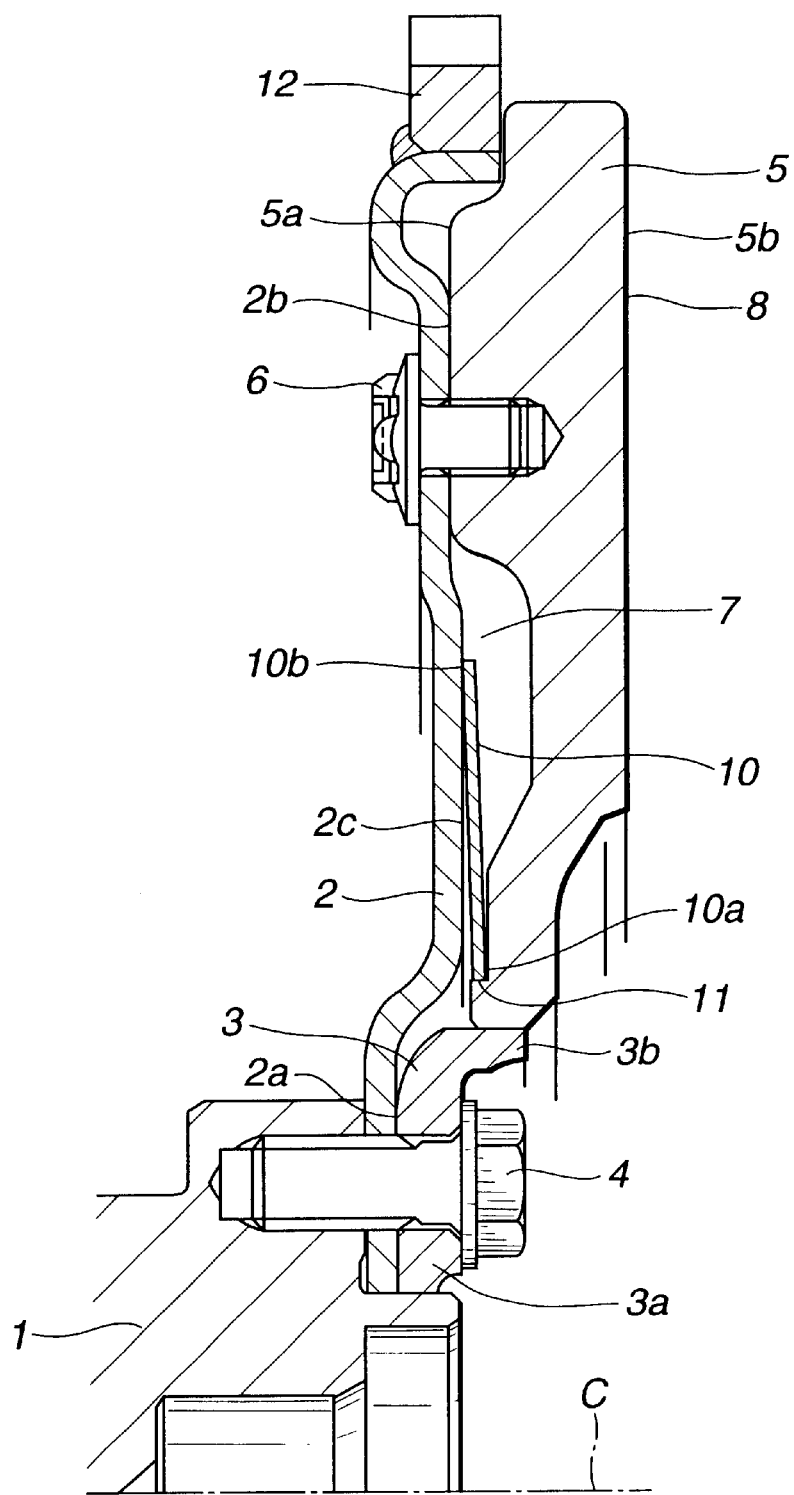
FIG. 6 is a partial cross-sectional view showing a fifth embodiment of the flywheel according to the present invention.
Figure 7:
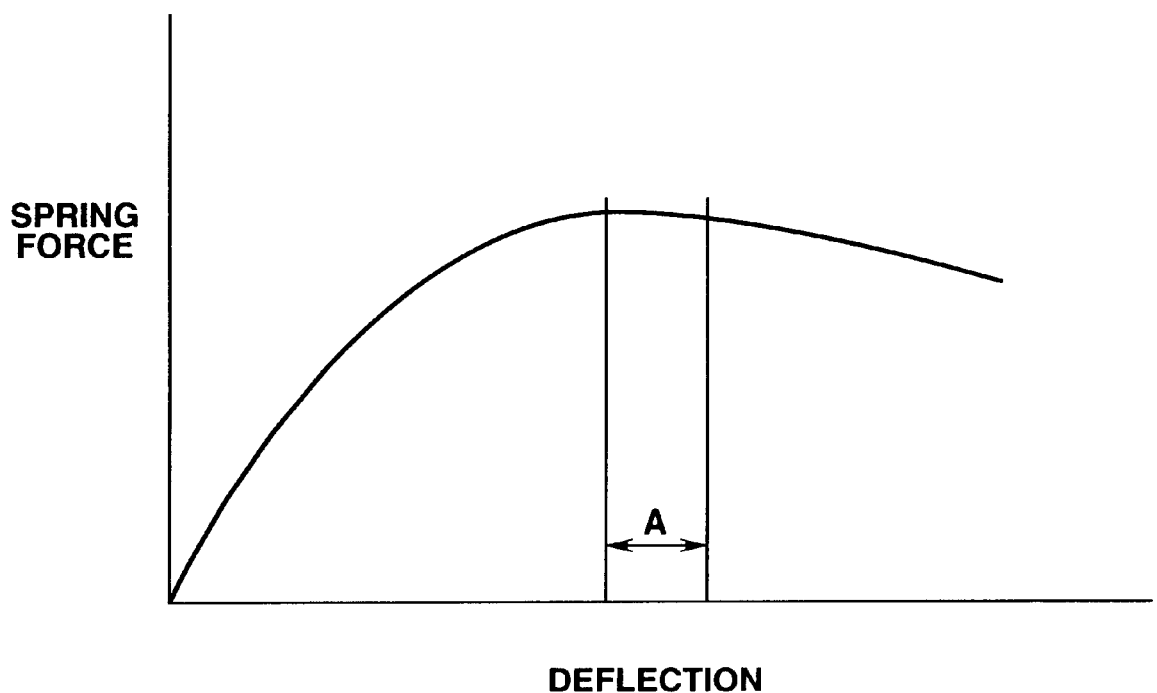
FIG. 7 is a graph showing a relationship between a spring force and a deflection of a spring member employed to the flywheel according to the present invention.

The fifth embodiment shown in FIG. 6 is arranged such that a truncated surface of the spring member 10 is in contact with a step portion 11 of the mass member 5 to position the spring member 10 diametrically, and a bottom surface of the spring member 10 is in contact with the flexible member 2.

With the thus arranged second to fifth embodiments according to the present invention, the advantages ensured by the first embodiment are also ensured. Additionally, since the spring member 10 is a disc spring and is installed in the clearance 7 while being put in a compressed state, it is possible to utilize a spring characteristic range where the change of the spring force of the spring member 10 is small with respect to the change of the deflection of the spring member 10, which range corresponds to a range A shown in FIG. 7. Accordingly, it becomes possible to stably ensure an initial load of the spring member 10. Further, since the change of the spring force of the spring member 10 is small, it is possible to control the characteristic frequency of the flywheel only by taking account of the rigidity of the flexible plate 2. That is, the spring member 10 is employed as if the spring member 10 functions only to damp the bending vibration of the flywheel.

Since the second and third embodiments of FIGS. 3 and 4 are arranged such that the truncated surface (top surface) of the spring member 10 of the disc spring is in contact with the flexible plate 2 and the bottom surface of the spring member 10 is fixed to the step portion 11 of the mass member 5, the top truncated surface of the spring member 1 is frictionally slid at the position between the flexible plate 2 and the mass member 5 where the relative displacement is large, and therefore the friction amount between the spring member 10 and the flexible plate 2 becomes large. This ensures an excellent damping performance. More specifically, since the mass member 5 is fixed at an outer peripheral side of the flexible plate 2 which inner peripheral side is fixed to the crankshaft 1, the relative displacement between the flexible plate 2 and the mass member 5 due to the deflection of the flexible plate 2 becomes large at a portion near the axial center of the crankshaft 1. Therefore, the relative friction amount between the truncated surface of the spring member 10 and the flexible plate 2 becomes large to perform the excellent damping performance.

Since the fourth embodiment shown in FIG. 5 is arranged such that the truncated surface portion 10a of the spring member 10 is in contact with the flexible plate 2, the fourth embodiment of FIG. 5 also ensures the advantages gained by the first embodiment.

Next, sixth and seventh embodiments respectively shown in FIGS. 8 and 9 will be discussed. The sixth and seventh embodiments of FIGS. 8 and 9 are arranged such that the spring member 10 is constituted by stacking a plurality of disc springs of a truncated cone shape and is disposed in a clearance 7 between the flexible plate 2 and the mass member 5 while being put in the compressed state.

Figure 8:
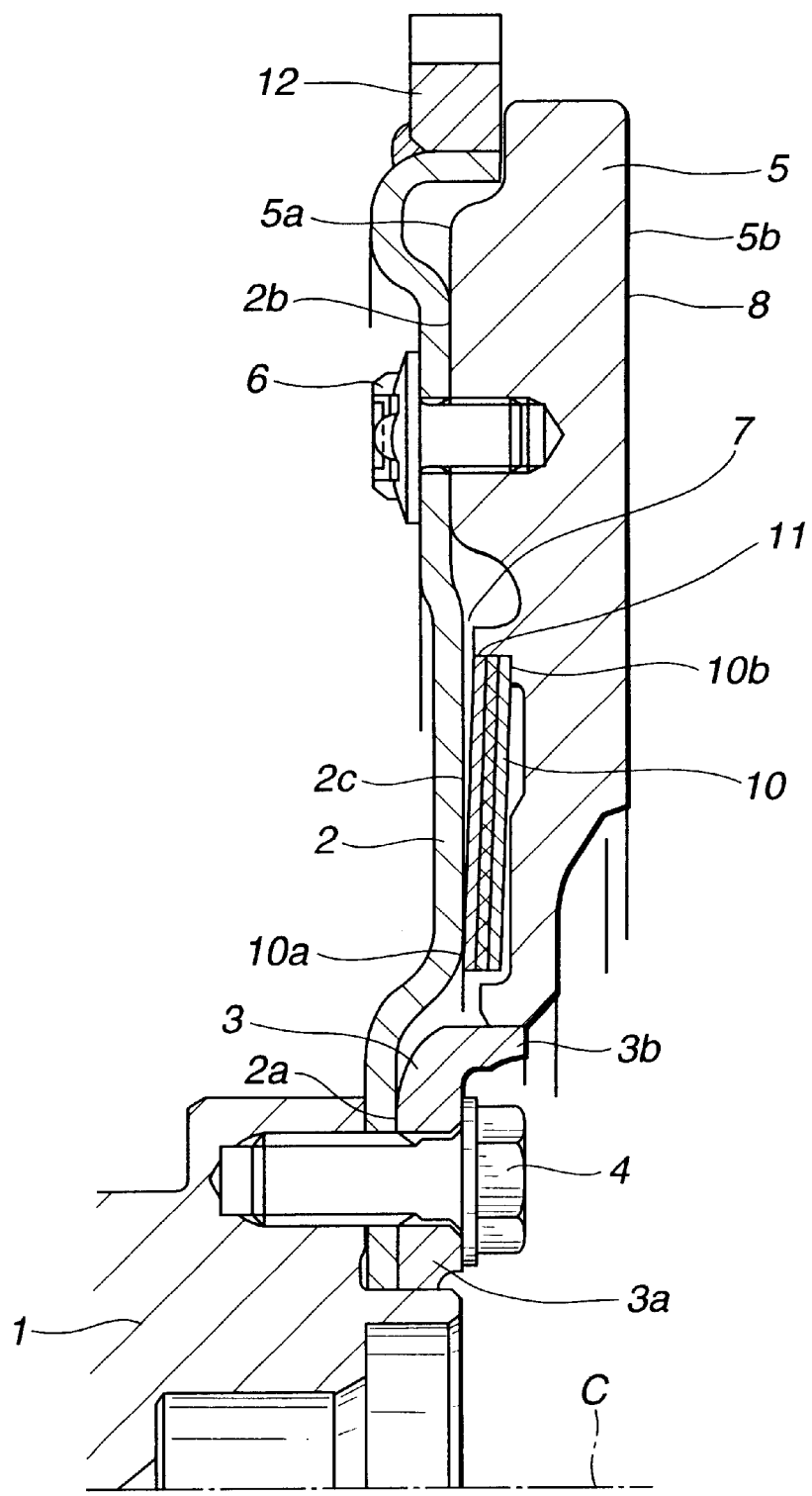
FIG. 8 is a partial cross-sectional view showing a sixth embodiment of the flywheel according to the present invention.

The sixth embodiment according to the present invention is particularly arranged such that the truncated surface portion 10*a* of the spring member 10 is in contact with the flexible plate 2 and the bottom surface portion 10*b* of the spring member 10 is in contact with the step portion 11 of the mass member 5 so as to determine the position of the spring member 10 diametrically, as shown in FIG. 8.

Figure 9:
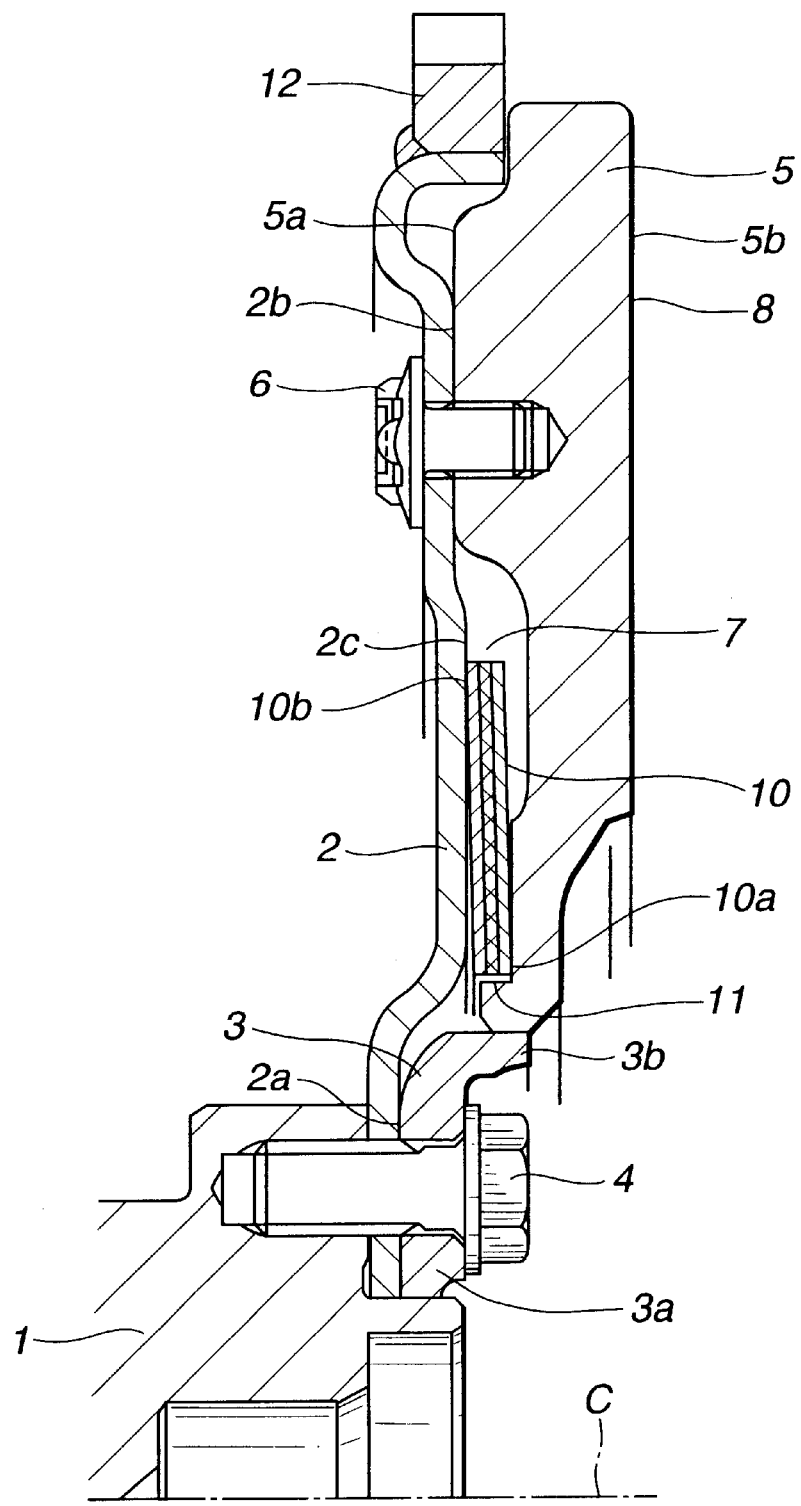
FIG. 9 is a partial cross-sectional view showing a seventh embodiment of the flywheel according to the present invention.

The seventh embodiment according to the present invention is particularly arranged such that the truncated surface portion 10*a* of the spring member 10 is fixed to the step portion 11 of the mass member 5 and the bottom surface portion 10*b* of the spring member 10 is in contact with the flexible plate 2, as shown in FIG. 9.

With the thus arranged sixth and seventh embodiments, the advantages gained by the first embodiment are also ensured. In addition, since the spring member 10 is constituted by stacking the plurality of disc springs of a truncated cone shape, it is possible to utilize the frictions among the plurality of the disc springs to damp the bending vibration of the flywheel. This enables the flywheel to ensure the excellent damping performance.

Referring to FIGS. 10 to 19, eighth to seventeenth embodiments of the flywheel according to the present invention will be discussed. These eighth to seventeenth embodiments are particularly arranged such that a clearance 14 is defined between the reinforcement plate 3 and the mass member 5, and the spring member 10 is disposed in the clearance 14 so as to be in contact with the reinforcement plate 3 and the mass member 5. The same elements and components of the first embodiment are denoted by the same reference numerals, and the explanation thereof is omitted herein.

First, the eighth to eleventh embodiments shown in FIGS. 10 to 13 will be discussed. These eighth to eleventh embodiments are arranged such that the clearance 14 is defined between the reinforcement plate 3 and the mass member 5, and that the spring member 10 of an annular waved spring member is disposed in the clearance 14.

Figure 10:
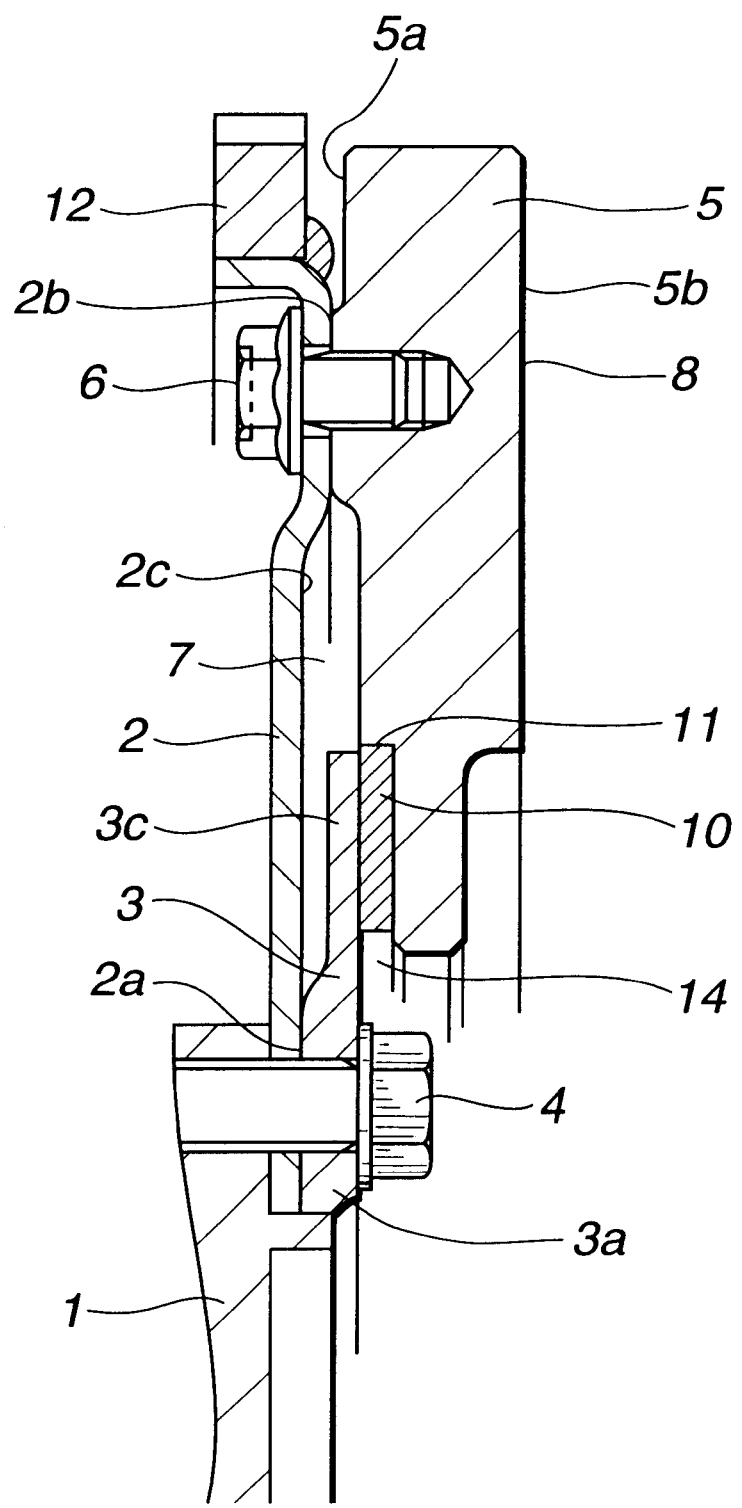
FIG. 10 is a partial cross-sectional view showing an eighth embodiment of the flywheel according to the present invention.
Figure 11:
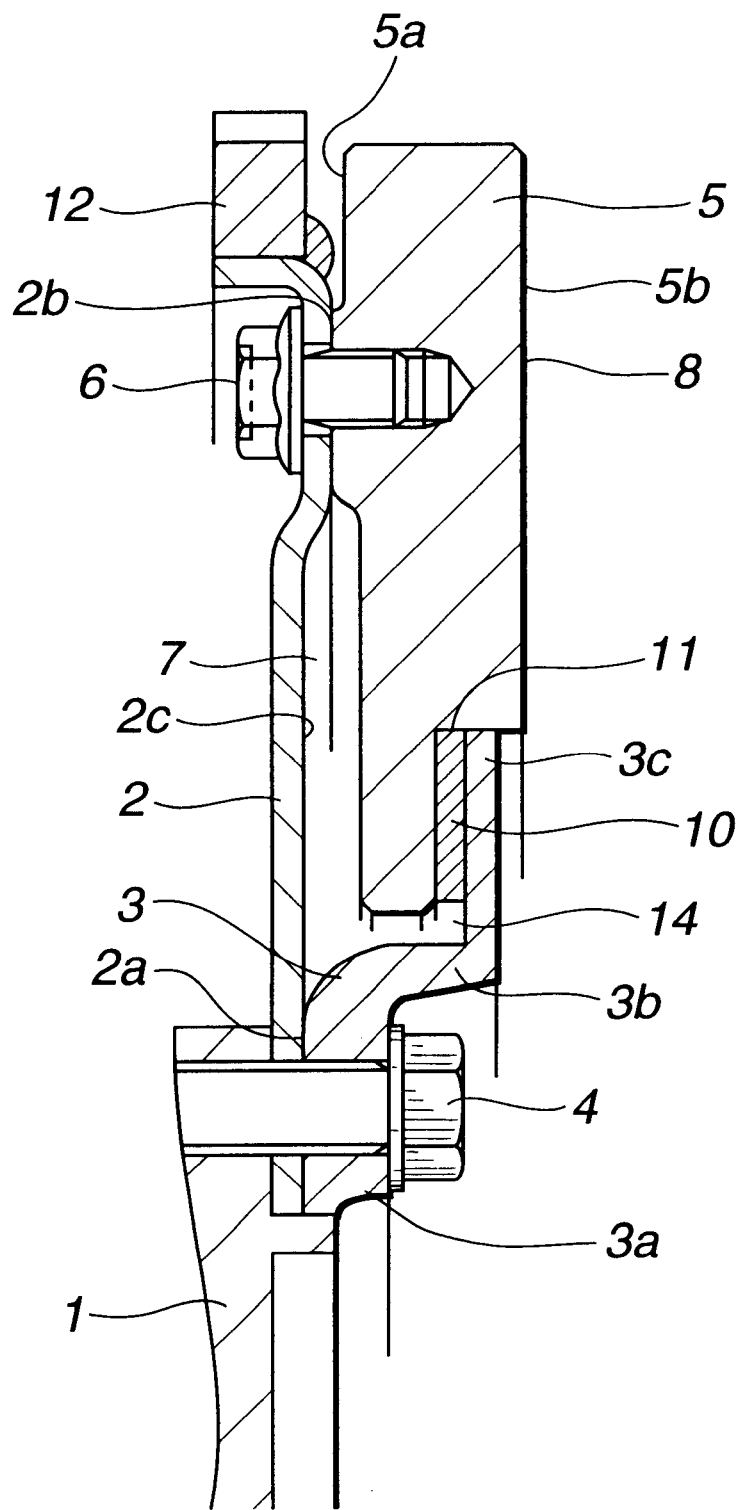
FIG. 11 is a partial cross-sectional view showing a ninth embodiment of the flywheel according to the present invention.

Further, the eighth and ninth embodiments of FIGS. 10 and 11 are arranged such that the spring member 10 is disposed at a portion between a flange 3*c* of the reinforcement plate 3 and the mass member 5. The flange 3*c* extends to the diametrically outer side. The outer periphery of the spring member 10 is diametrically positioned by being fixed to the step portion 11 of the mass member 5. The eighth embodiment shown in FIG. 10 is arranged such that the flange 3*c* of the reinforcement plate 3 is formed at an outer periphery of the base portion 3*a* of the reinforcement plate 3. The ninth embodiment of FIG. 11 is arranged such that the flange 3*c* is formed at an end portion of an annular flange portion 3*b* of the reinforcement plate 3.

Figure 12:
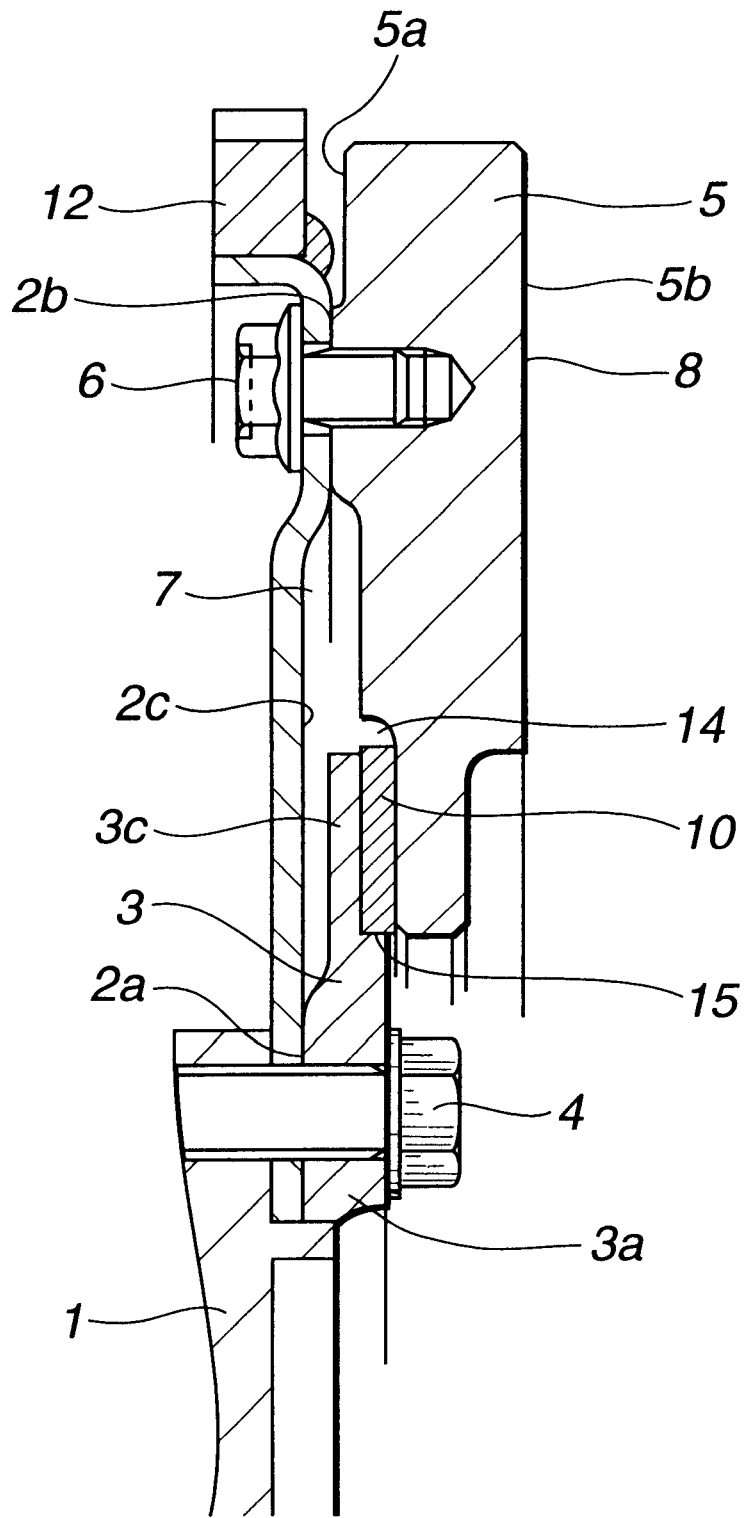
FIG. 12 is a partial cross-sectional view showing a tenth embodiment of the flywheel according to the present invention.
Figure 13:
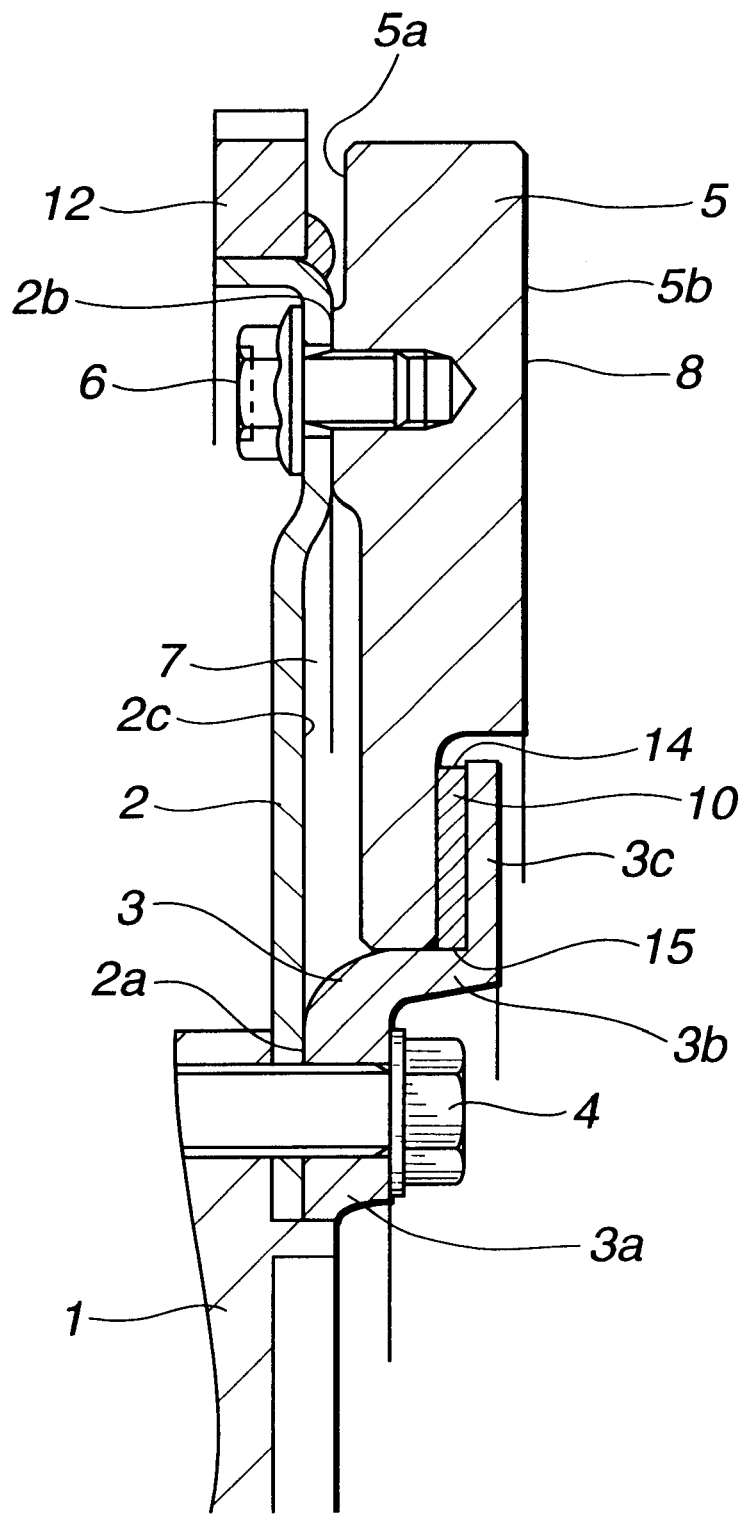
FIG. 13 is a partial cross-sectional view showing an eleventh embodiment of the flywheel according to the present invention.

The tenth and eleventh embodiments of FIGS. 12 and 13 are arranged such that the spring member 10 is disposed at a portion between a flange 3*c* of the reinforcement plate 3 and the mass member 5. The flange 3*c* extends to a diametrically inside direction. The inner periphery of the spring member 10 is diametrically positioned by being fixed to a step portion 15 of the reinforcement plate 3. The tenth embodiment shown in FIG. 12 is further arranged such that the flange 3*c* of the reinforcement plate 3 is formed at an outer periphery of the base portion 3*a* of the reinforcement plate 3. The eleventh embodiment of FIG. 13 is further arranged such that the flange 3*c* is formed at an end portion of an annular flange portion 3*b* of the reinforcement plate 3.

With the thus arranged ninth to eleventh embodiments, the flexible plate 2 and the spring member 10 function to vary the characteristic bending frequency of the crankshaft system from the regular range and to absorb the bending vibration. Further, since the spring member 10 is deflected between the reinforcement pate 3 and the mass member 5, both ends of the spring member 10 generate friction with the reinforcement plate 3 and the mass member 5. This functions as a frictional damping effect with respect to the bending vibration.

Since the spring member 10 is disposed in the clearance 14 between the reinforcement plate 2 and the mass member 5, the spring member 10 never face with the fixing portion of the flexible plate 2 to the crankshaft 1. Therefore, even if the spring member 10 is disposed in the clearance 14, the projections of the head portions of the installation bolts 4 with respect to an end surface of the crankshaft 1 are suppressed. That is, it is possible to provide the flywheel that is able to install the spring member 10 without increasing the projection amount of the installation bolt 4 and to effectively reduce the bending vibration.

Further, since the spring member 10 is disposed to be in contact with the reinforcement plate 3 and the mass member 5, it is possible to ensure a relatively large space (clearance 7) between the spring member and the flexible plate 2. This improves the cooling effect of the spring member 10.

Since the inner or outer peripheries of the spring member 10 is fixed to the step portion 15 of the reinforcement plate 3 or the step portion 11 of the mass member 5, the spring member 10 is easily positioned at a correct position. This functions to prevent the spring member 10 from moving in the diametrical direction.

Next, twelfth to fifteenth embodiments shown in FIGS. 14 to 17 will be discussed. These twelfth to fifteenth embodiments are arranged such that the spring member 10 of the truncated cone shaped disc spring is axially disposed in the clearance 14 defined between the reinforcement plate 3 and the mass member 5 while being put in a compressed state.

Figure 14:
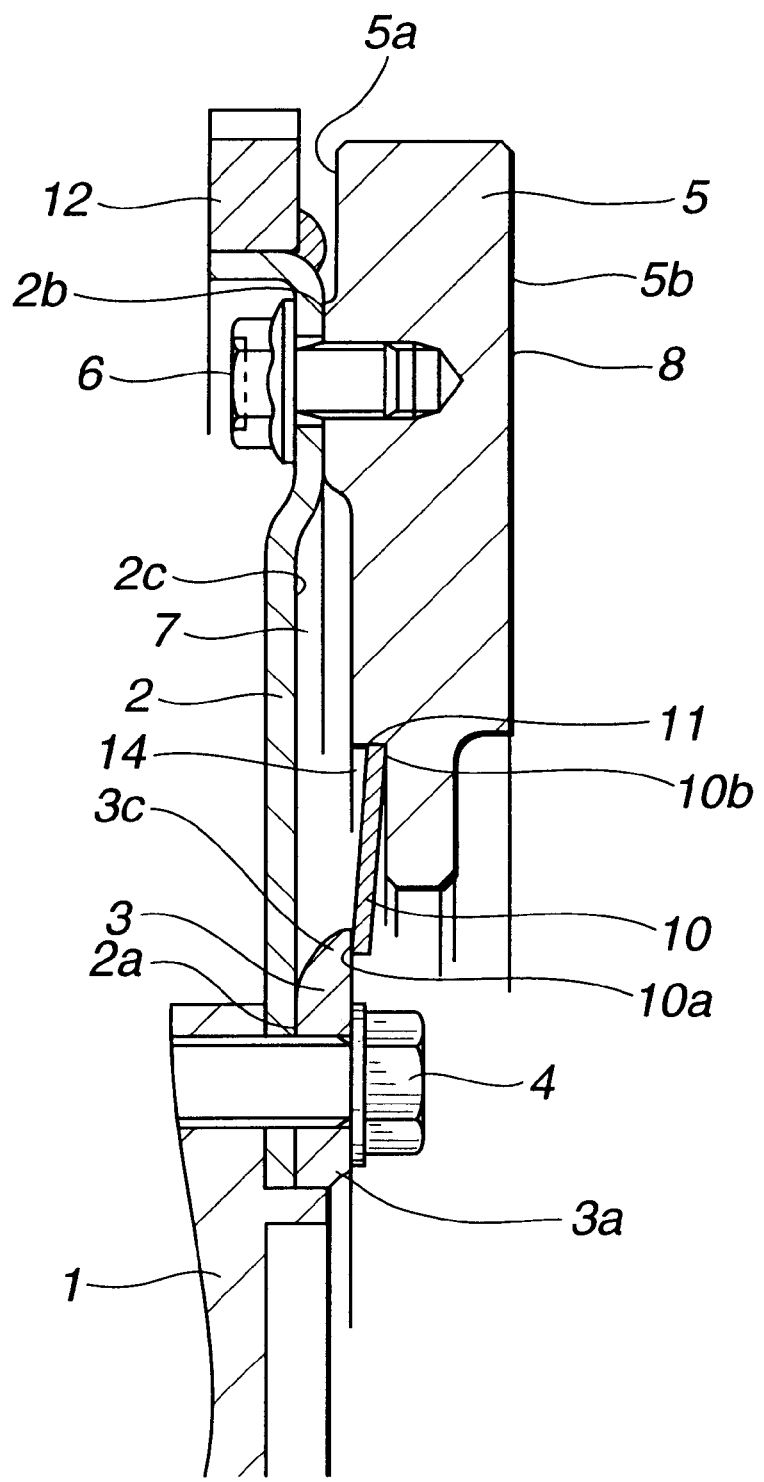
FIG. 14 is a partial cross-sectional view showing a twelfth embodiment of the flywheel according to the present invention.
Figure 15:
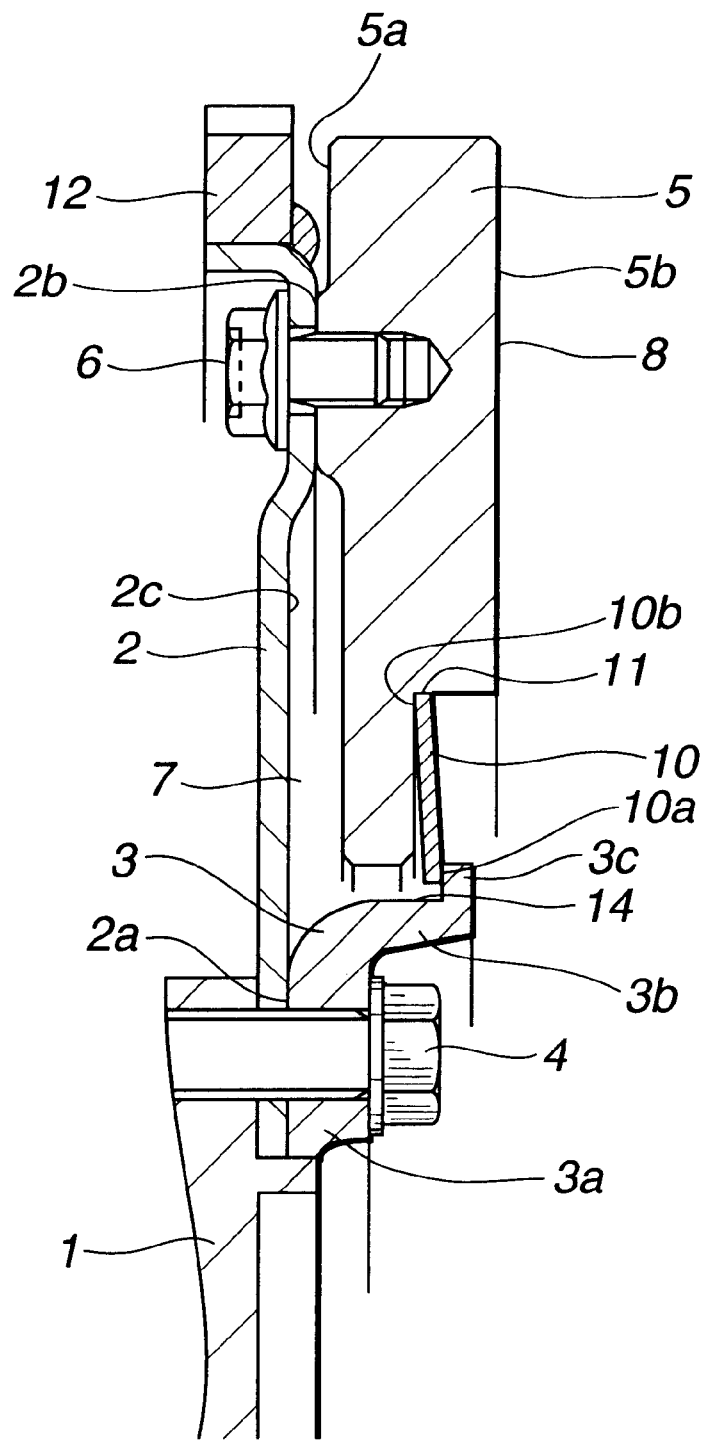
FIG. 15 is a partial cross-sectional view showing a thirteenth embodiment of the flywheel according to the present invention.

The twelfth and thirteenth embodiments of FIGS. 14 and 15 are particularly arranged such that the spring member 10 is disposed between a flange 3*c* of the reinforcement plate 3 and the mass member 5, the truncated surface portion 10*a* of the spring member 10 is in contact with the reinforcement plate 2, and the bottom portion 10*b* of the spring member 10 is fixed to the step portion 11 of the mass member 5 so that the spring member 10 is diametrically positioned with respect to the reinforcement plate 3. The flange portion 3*c* of the reinforcement plate 3 extends from an outer end portion of the reinforcement plate 3 to a diametrically outer direction. The twelfth embodiment of FIG. 14 is arranged such that the flange portion 3*c* is formed at an outer periphery of the base portion 3*a* of the reinforcement plate 3. The thirteenth embodiment of FIG. 15 is arranged such that the flange portion 3*c* is formed at an end of an annular flange portion 3*b* of the reinforcement plate 3.

Figure 16:
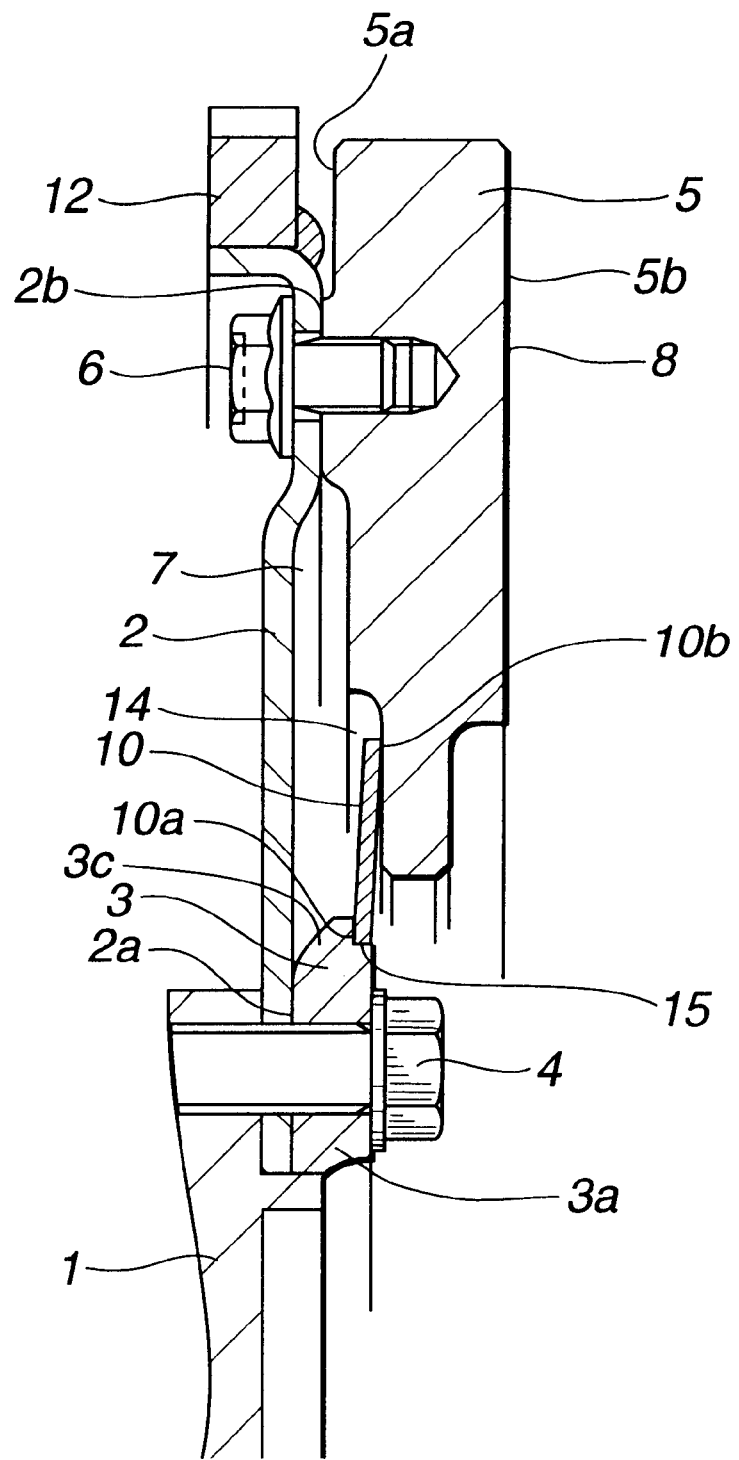
FIG. 16 is a partial cross-sectional view showing a fourteenth embodiment of the flywheel according to the present invention.
Figure 17:
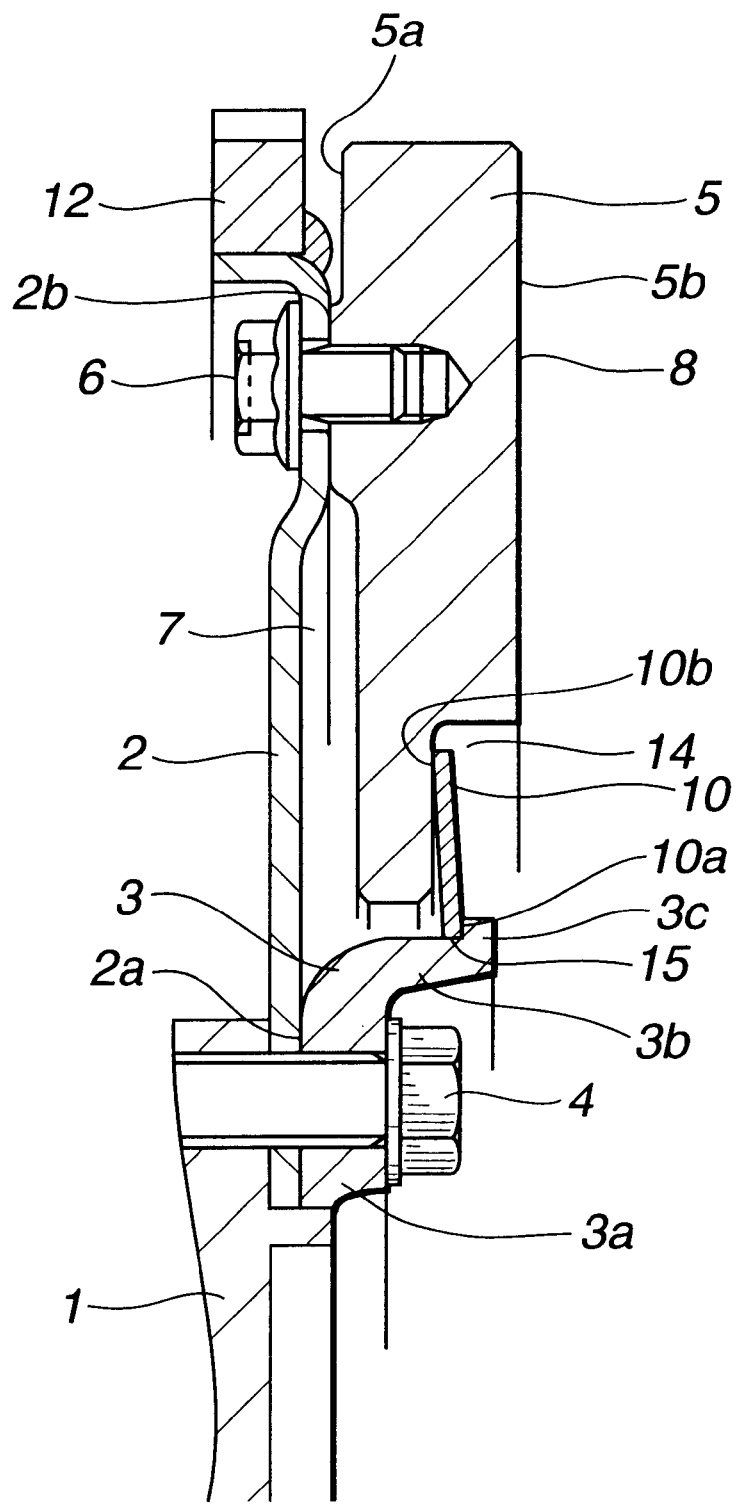
FIG. 17 is a partial cross-sectional view showing a fourteenth embodiment of the flywheel according to the present invention.

The fourteenth and fifteenth embodiments shown in FIGS. 16 and 17 are arranged such that the spring member 10 is disposed between a flange 3*c* of the reinforcement plate 3 and the mass member 5, the truncated surface portion 10*a* of the spring member 10 is fixed to the step portion 15 of the reinforcement plate 3 so that the spring member 10 is diametrically positioned with respect to the reinforcement plate 3, and the bottom surface portion 10*b* of the spring member 10 is in contact with the fixed to the mass member 5. The flange portion 3c of the reinforcement plate 3 extends from an outer end portion of the reinforcement plate 3 to a diametrically outer direction. The fourteenth embodiment of FIG. 16 is arranged such that the flange portion 3c is formed at an outer periphery of the base portion 3a of the reinforcement plate 3. The fifteenth embodiment of FIG. 17 is arranged such that the flange portion 3c is formed at an end of an annular flange portion 3b of the reinforcement plate 3.

With the thus arranged twelfth to fifteenth embodiments, the advantages ensured by the first embodiment are also ensured by these embodiments. Additionally, since the spring member 10 is a disc spring and is installed in the clearance 7 while being put in a compressed state, it is possible to utilize a spring characteristic range where the change of the spring force of the spring member 10 is small with respect to the change of the deflection of the spring member 10, which range corresponds to a Furthermore, since the twelfth and thirteenth embodiments of FIGS. 14 and 15 are arranged such that the truncated surface portion 10a of the spring member 10 of a disc spring is in contact with the reinforcement plate 3 and the bottom surface portion 10b of the spring member 10 is fixed to the step portion 11 of the mass member 5, the truncated surface portion 10a of the spring member 10 is frictionally slid at the position between the reinforcement plate 3 and the mass member 5 where the relative displacement is large, and therefore the friction amount between the spring member 10 and the reinforcement plate 3 becomes large. This ensures an excellent damping performance. More specifically, since the mass member 5 is fixed at an outer peripheral side is fixed to the crankshaft 1, the relative displacement between the reinforcement plate 3 and the mass member 5 due to the deflection of the flexible plate 2 becomes large at a portion near the axial center of the crankshaft 1. Therefore, the relative friction amount between the top end portion of the spring member 10 and the reinforcement plate 3 becomes large to perform the excellent damping performance.

Figure 18:
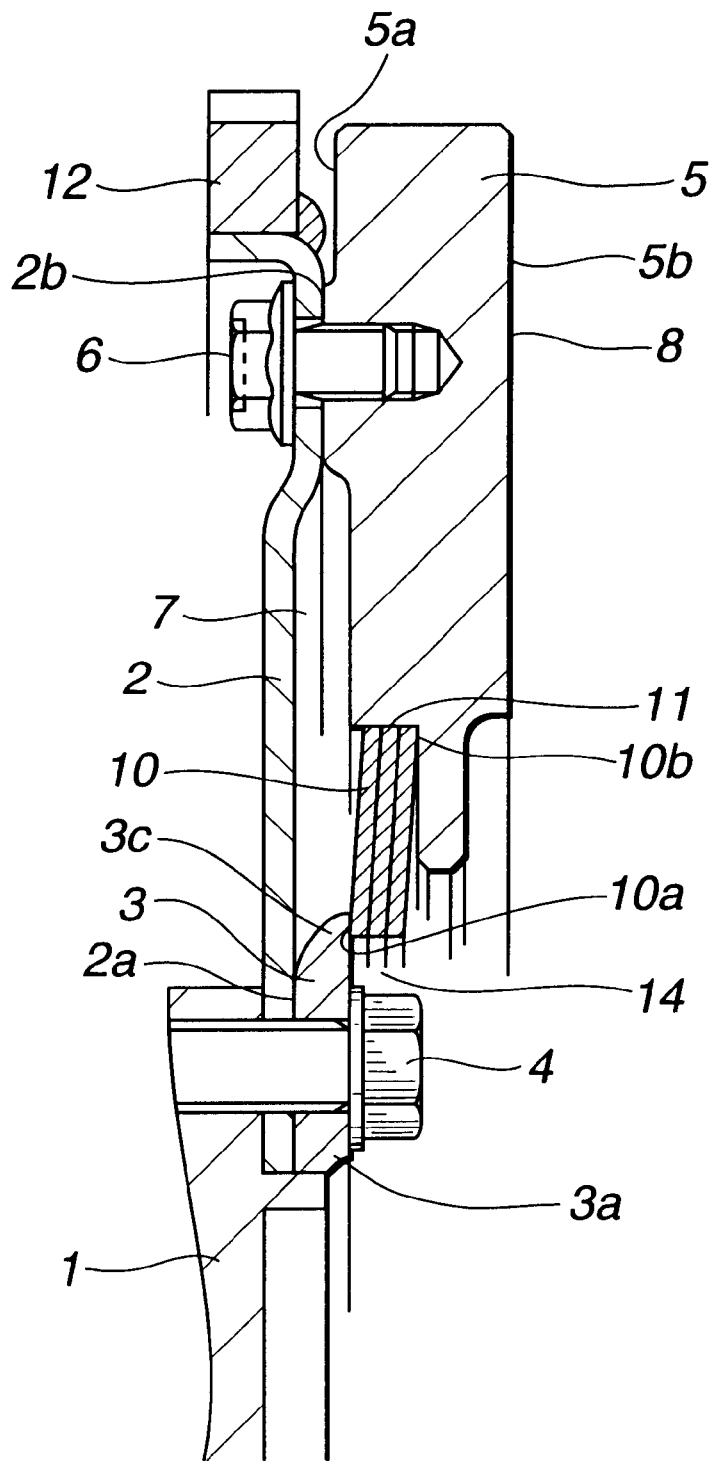
FIG. 18 is a partial cross-sectional view showing a fifteenth embodiment of the flywheel according to the present invention.
Figure 19:
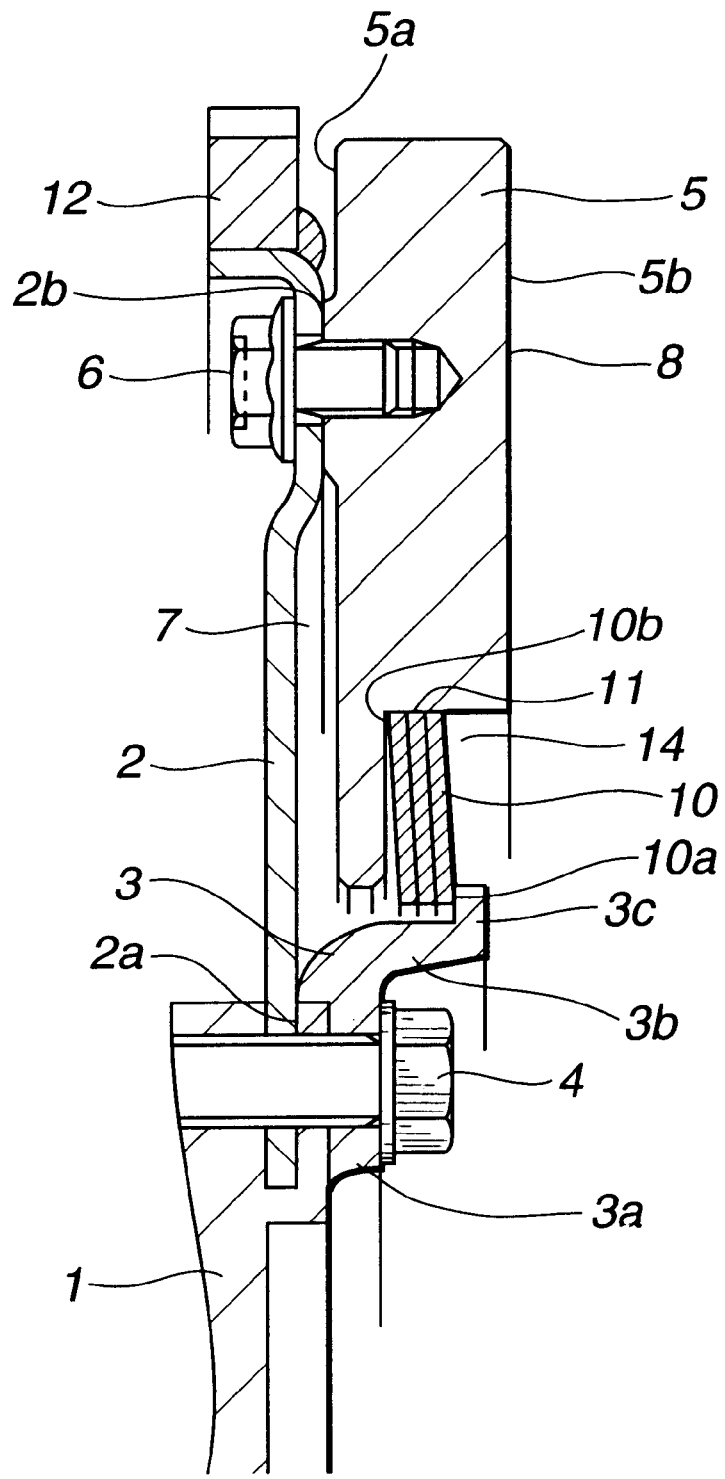
FIG. 19 is a partial cross-sectional view showing a sixteenth embodiment of the flywheel according to the present invention.

Next, sixteenth and seventeenth embodiments shown in FIGS. 18 and 19 will be discussed. The sixteenth and seventeenth embodiments of FIGS. 18 and 19 are arranged such that the spring member 10 is constituted by stacking a plurality of disc springs of a truncated-cone shape and is disposed in the clearance 7 between a flange portion 3c of the reinforcement plate 3 and the mass member 5. A truncated surface portion 10 of the spring member 10 is in contact with the reinforcement plate 3, and the bottom portion 10b of the spring member 10 is fixed to the step portion 11 of the mass member 5 so that the spring member 10 is diametrically positioned. The flange portion 3c of the reinforcement plate 3 diametrically extends outward. The sixteenth embodiment of FIG. 18 is particularly arranged such that the flange portion 3c of the reinforcement plate 3 is formed at an outer periphery of the base portion 3a of the reinforcement plate 3. The seventeenth embodiment of FIG. 19 is particularly arranged such that the top end portion of the spring member 10 is fixed to the step portion 11 of the mass member 5 and the bottom portion 10b of the spring member 10 is in contact with the flexible plate 2.

With the thus arranged sixteenth and seventeenth embodiments according to the present invention, the advantages gained by the first embodiment are also ensured. In addition, since the spring member 10 is constituted by stacking the plurality of disc springs of a truncated cone shape, it is possible to utilize the frictions among the plurality of the disc springs to damp the bending vibration. This enables the flywheel to ensure the excellent damping performance.

The entire contents of Japanese Patent Application No. 10-281236 filed on Oct. 2, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. For example, a spring made of rubber or synthetic resin may be employed as the spring member 10.

What is claimed is:

1. A flywheel for an internal combustion engine comprising:
   a flexible plate connected to a crankshaft of the engine;
   a mass member fixedly connected to said flexible plate;
   means defining a clearance at an axially outer portion with respect to a connecting portion of said flexible plate to the crankshaft; and
   a spring member disposed in said clearance defining means, both ends of said spring member being in contact with said clearance defining means.

2. A flywheel as claimed in claim 1, wherein said spring member includes an annular spring plate, one of outer and inner peripheries of the annular spring plate being fixed to a step portion of said mass member.

3. A flywheel as claimed in claim 1, wherein said spring member includes a disc spring of a truncated-cone shape, said spring member being installed in said clearance while being put in a compressed state.

4. A flywheel as claimed in claim 1, wherein said spring member includes a disc spring of a truncated cone shape, a truncated surface portion of said spring member being in contact with said flexible member, the other end portion of said spring member being fixed to a step portion of said mass member.

5. A flywheel as claimed in claim 1, wherein said spring member includes a plurality of disc springs of a truncated cone shape, said disc springs being employed in a stacked condition.

6. A flywheel as claimed in claim 1, further comprising a reinforcement plate through which said flexible plate is connected to the crankshaft.

7. A flywheel as claimed in claim 6, wherein said spring member includes an annular spring plate, an inner peripheral portion of said spring member being in contact with said reinforcement plate, an outer peripheral portion of said spring member being fixed to a step portion of said mass member.

8. A flywheel as claimed in claim 6, wherein said spring member includes an annular spring plate, an outer peripheral portion of said spring member being in contact with said mass member, an outer peripheral portion of said spring member being fixed to a step portion of said reinforcement plate.

9. A flywheel as claimed in claim 6, wherein said spring member includes a disc spring of a truncated-cone shape, said spring member being installed in said clearance while being put in a compressed state.

10. A flywheel as claimed in claim 6, wherein said spring member includes a disc spring of a truncated-cone shape, a truncated surface portion of said spring member being in contact with said flexible member, the other surface portion of said spring member being fixed to a step portion of said mass member.

11. A flywheel as claimed in claim 6, wherein said spring member includes a plurality of disc springs of a truncated-cone shape, said disc springs being employed in a stacked condition.

12. A flywheel for an internal combustion engine, the flywheel disposed between the engine and a clutch apparatus, the flywheel comprising:

a flexible plate of a disc shape having a first connecting portion positioned at a generally center portion of said flexible plate, a second connecting portion positioned at a diametrically outer peripheral portion of said flexible plate and a clearance defining portion between the first and second connecting portion, the first connecting portion being fixedly connected to the crankshaft;

a mass member having a first surface and a second surface, the first surface having an outer part at which said mass member is fixedly connected to the second connecting portion of said flexible plate and an inner part with which the clearance defining portion of said flexible place defines a clearance, the second surface including a friction surface for facing with a friction plate of the clutch apparatus; and a spring member disposed in the clearance, said spring member having a first end in contact with said flexible plate and a second end in contact with said mass member.

13. A flywheel for an internal combustion engine, the flywheel disposed between the engine and a clutch apparatus, the flywheel comprising:

a flexible plate of a disc shape having a first connecting portion positioned at a generally center portion of said flexible plate, a second connecting portion positioned at a diametrically outer peripheral portion of said flexible plate, the first connecting portion being fixedly connected to the crankshaft;

a reinforcement plate through which said flexible plate is fixedly connected to said crankshaft, said reinforcement plate having a clearance defining portion;

a mass member having a first surface and a second surface, the first surface including a part at which said mass member is fixedly connected to the second connecting portion of said flexible plate, the second surface including a friction surface for facing with a friction plate of the clutch apparatus, said mass member further having a clearance defining portion with which the reinforcement plate clearance defining portion defines a clearance; and a spring member disposed in the clearance, said spring member having a first end in contact with said reinforcement plate and a second end in contact with said mass member.

14. A flywheel as claimed in claim 1, wherein said mass member is fixed to said flexible plate by means of a plurality of bolts.

15. A flywheel as claimed in claim 1, wherein said mass member is immovably bolted to said flexible plate.

* * * * *